United States Patent [19]

Yanagita et al.

[11] 4,456,955
[45] Jun. 26, 1984

[54] ALIGNMENT OF ONE OPERAND OF A TWO OPERAND ARITHMETIC UNIT

[75] Inventors: Tomoatsu Yanagita, Isehara; Motonobu Nagafuji, Hadano, both of Japan

[73] Assignee: Hitachi, Ltd., Tokyo, Japan

[21] Appl. No.: 294,053

[22] Filed: Aug. 18, 1981

[30] Foreign Application Priority Data

Aug. 27, 1980 [JP] Japan ................. 55-118218

[51] Int. Cl.³ .................. G06F 7/38; G06F 13/00
[52] U.S. Cl. .................................... 364/200
[58] Field of Search ................... 364/200, 900

[56] References Cited

U.S. PATENT DOCUMENTS

| | | | |
|---|---|---|---|
| 4,135,242 | 1/1979 | Ward | 364/200 |
| 4,189,768 | 2/1980 | Liptay | 364/200 |
| 4,219,874 | 8/1980 | Gusev | 364/200 |
| 4,268,909 | 5/1981 | Kindell | 364/200 |
| 4,317,170 | 2/1982 | Wada et al. | 364/200 |

OTHER PUBLICATIONS

FP780 *Floating-Point Accelerator Technical Description,* Digital Equipment Corporation, 1978, pp. 2-37 to 2-41.

*Primary Examiner*—Harvey E. Springborn
*Attorney, Agent, or Firm*—Antonelli, Terry & Wands

[57] ABSTRACT

A data processing system has an arithmetic operating unit to process a plurality of bytes at a time and carries out an arithmetic operation on first and second operands each starting from any desired address on a main memory and having any desired number of byte length. The second operand is aligned to an operand position of the first operand and the aligned second operand is supplied to the operating unit while the first operand is supplied as it is to the operating unit. Since the second operand is aligned to the operand position of the first operand before it is processed in the operating unit, the number of times of alignment is reduced.

3 Claims, 11 Drawing Figures

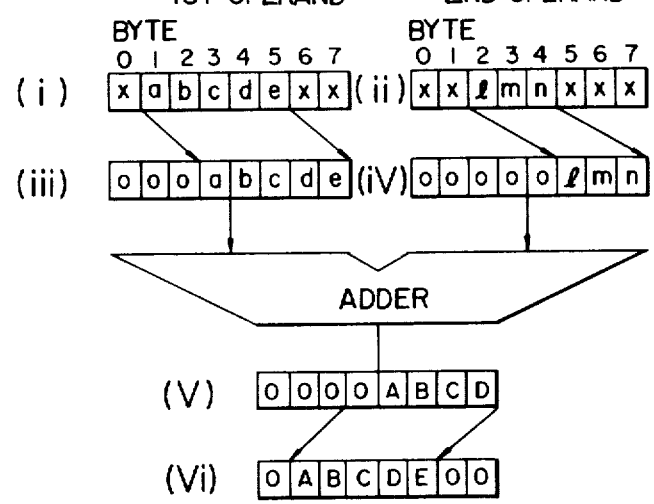
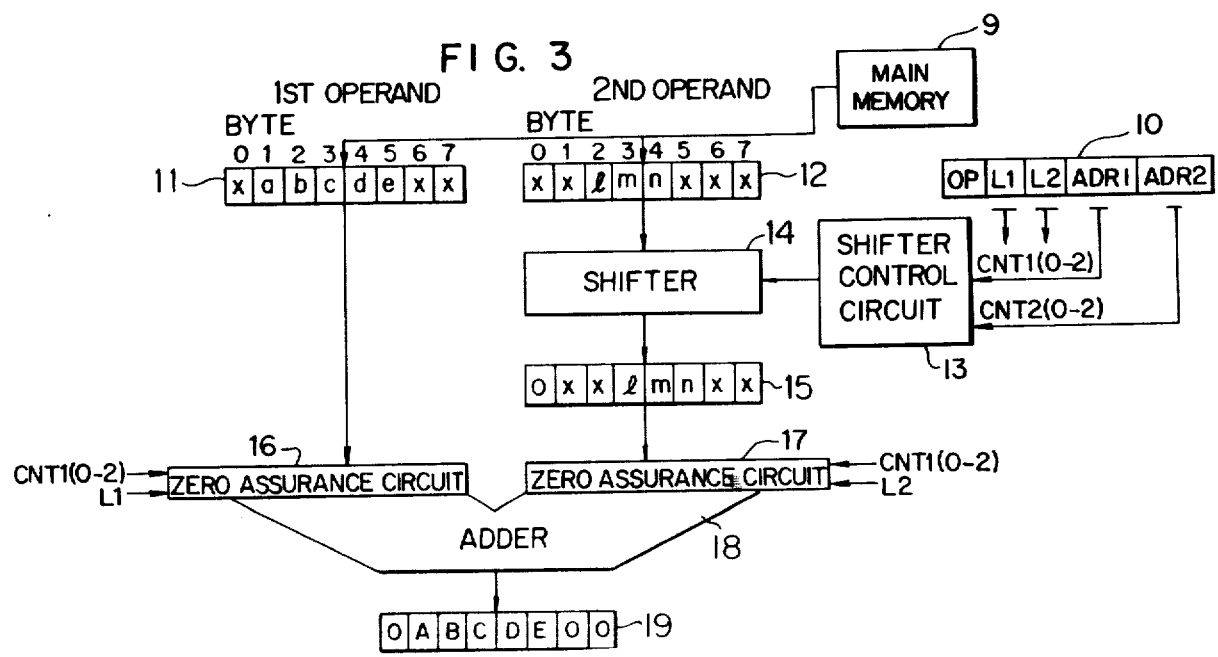

ALIGNMENT OF ONE OPERAND OF A TWO OPERAND ARITHMETIC UNIT

BACKGROUND OF THE INVENTION

1. Field of the Invention

The present invention relates to a data processing system, and more particularly to a data processing system which can reduce the total time of operation when first and second operands each starting at any desired address of a main memory and having any desired byte length are processed.

2. Description of the Prior Art

In a data processing system, when a variable operand length instruction, such as a decimal operation instruction, is to be processed, it may be processed byte by byte by a one-byte width adder or a plurality of bytes at a time by a four- or eight-byte width adder in order to process at a high speed.

The latter method can process faster that the former method because a plurality of bytes are processed at a time. However, the latter method still has a problem to be resolved in that much time is required to align the operand position. The latter method is more specifically described below. The first operand is shifted to align to a specified byte position. Then, the second operand is shifted to align to the same byte position as the first operand. The first and second operands are then processed. A result of the operation is shifted to align to the first operand position. Thus, three alignments of the operand position, that is, the shift of the first operand, the shift of the second operand and the shift of the operation result are required. As a result, the time required to perform the alignment of the operand position is long relative to the actual operation time and the instruction executive time is not shortened in spite of the provision of the wide width adder.

SUMMARY OF THE INVENTION

It is an object of the present invention to provide a data processing system which reduces the time required for the alignment of the operand position by reducing the number of times alignment is performed so that the execution performance for the instruction is enhanced.

In accordance with the present invention, the operation is carried out while the operand position of the second operand is aligned to the operand position of the first operand. By this method, the required number of times of alignment of the operand position is reduced to one.

BRIEF DESCRIPTION OF THE DRAWINGS

FIG. 1 shows an example of a variable operand length instruction used to explain the invention.

FIG. 2 shows a prior art example for processing on the instruction of FIG. 1 a plurality of bytes at a time.

FIG. 3 illustrates an embodiment of the present invention, respectively.

DESCRIPTION OF THE PREFERRED EMBODIMENTS

Figure 4:
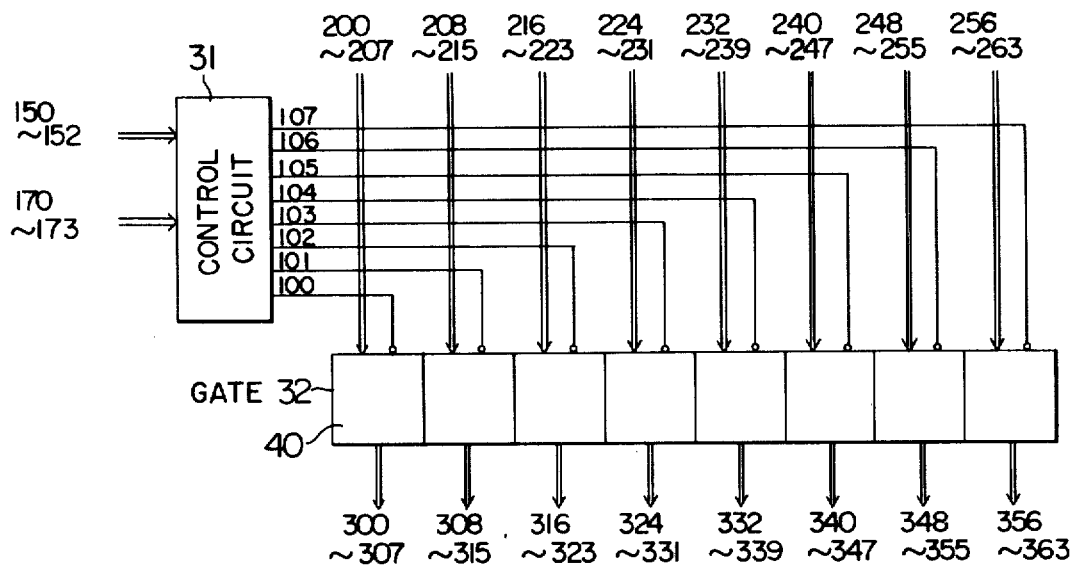
FIG. 4 is a logic circuit diagram of the zero assurance circuits of FIG. 3.

For the sake of convenience, an instruction as shown in FIG. 1 is considered as a variable operand length instruction in the following description. In FIG. 1, an OP field indicates a type of operation such as add, subtract, multiply or divide, $L_1$ and $L_2$ fields indicate the lengths in bytes of the first and second operands, respectively, and ADR1 and ADR2 fields indicate leading addresses in a main storage of the first and second operands, respectively. The $L_1$ and $L_2$ fields are assumed to have four bits, respectively. (Thus, a maximum operand length is 15 bytes). It is now assumed that the first operand having the length of $L_1$ bytes from the address in the main memory indicated by the ADR1 field and the second operand having the length of $L_2$ bytes from the address in the main memory indicated by the ADR2 field are added or subtracted with the right ends (trailing ends) of the operands being aligned, that is, each operand has a decimal point at a right end of the operand field and the result of this operation is stored in the first operand field in the main memory. It is also assumed that the data transfer between the processor and the main memory is effected eight bytes at a time.

In order to facilitate an understanding of the present invention, prior art examples are first explained with reference to FIG. 2.

FIG. 2 shows a prior art system which executes the instruction of FIG. 1 to process a plurality of bytes at a time by an eight-byte width adder, in which a five-byte first operand "abcde" from a byte position 1 in an eight-byte address boundary in a main memory and a three-byte second operand "lmn" from a byte position 2 in the eight-byte address boundary in the main memory are added together. The first operand (i) read from the main memory is shifted right by two bytes so that the right end thereof is aligned to a byte position 7 as shown in (iii). "0's" are inserted into the byte positions 0-2 on the left of the left end of the operand. The second operand (ii) read from the main memory is then shifted right by three bytes so that the right end thereof is aligned to the byte position 7, and "0's" are inserted into the byte positions 0-4 on the left of the left end of the operand, as shown in (iv). The operands (iii) and (iv) so aligned are applied to an adder to produce a sum (v). Finally, the sum is shifted left by two bytes to align it to the first operand position as shown in (vi) and the aligned sum is stored in the main memory.

As described above with reference to FIG. 2, the prior art systems for processing a plurality of bytes at a time need three alignments of the operand position, that is the right shift of the first operand, the right shift of the second operand and the left shift of the operation result. As a result, the time required for the alignment of the operand position is long relative to the actual operation time and the instruction execution time is not shortened in spite of the provision of the wide width adder.

FIG. 3 shows a block diagram of one embodiment of the present invention, in which a five-byte first operand "abcde" from a byte position 1 in an eight-byte address boundary of a main memory and a three-byte second operand "lmn" from a byte position 2 in the eight-byte address boundary are added, like the example of FIG. 2. In FIG. 3, the first operand read from the main memory 9 is loaded into a register 11 while the second operand is loaded into a register 12. The instruction described above is set into an instruction register 10. The second operand in the register 12 is supplied to a shifter 14 where it is aligned with the operand position of the first operand and the aligned second operand is loaded into a register 15. That is, the second operand is shifted right by two bytes. The shifter 14 is a well-known one which is controlled by a shifter control circuit 13, which in turn is a well-known subtraction circuit to which the respective three low bits CNT1(0-2) and CNT2(0-2) of the leading addresses (right end addresses) of the first and second operands, respectively, indicated by the command are applied and which subtracts the three low bits CNT2(0-2) of the leading address of the second operand from the three low bits CNT1(0-2) of the leading address of the first operand. If a difference is positive, the shifter 14 shifts the second operand to the right by the number of bytes corresponding to the difference, and if the difference is negative, it shifts the second operand to the left by the number of bytes corresponding to the difference. In the example of FIG. 3, the second operand is shifted right by one byte so that the right end of the second operand is aligned to the right end of the first operand. The first operand in the register 11 is applied as it is to an adder 18 through a zero assurance circuit 16 to be described later and the second operand in the register 15, which has been aligned to the operand position of the first operand, is applied to the adder 18 through a zero assurance circuit 17 to be described later. The adder 18 adds the input first and second operands and a resulting sum is loaded into a register 19. The sum is in alignment with the operand position of the first operand and hence it may be stored as it is in the main memory.

In this manner, in accordance with the present invention, the number of times of the alignment of the operand position is reduced from three, which was necessary in the prior art system, to one, and the instruction execution performance is enhanced. In the operation in accordance with the present invention, a correct result could not be obtained if zeros were not assured in the byte positions on the right of the right ends of the first and second operands (that is, the byte positions 6 and 7 of the registers 11 and 15) and in the byte positions on the left of the left ends (that is, the byte position 0 of the register 11 and the byte positions 0-2 of the register 15) in the addition operation of FIG. 3. The high-speed zero assurance circuits 16 and 17 shown in FIG. 3 assure zeros in the ineffective positions of the first and second operands. The circuit 16 in FIG. 3 determines the ineffective positions of the first operand from the right end byte position of the first operand and the length of the first operand, and the circuit 17 in FIG. 3 determines the ineffective positions of the second operand from the right end byte position of the first operand and the length of the second operand, to assure zeros at those positions.

It is now assumed that the eight-byte position pointers CNT1(0), CNT1(1) and CNT1(2) contain the three lower bits of the right end address of the first operand respectively.

Table 1 shows ineffective byte positions on the right of the right end of the operand. For example, when CNT1(0-2) are "5", the byte positions 6 and 7 are ineffective bytes (for the first operand in the register 11 in FIG. 3).

TABLE 1

| Content of CNT1(0-2) | | | | | | | |
|---|---|---|---|---|---|---|---|
| 0 | 1 | 2 | 3 | 4 | 5 | 6 | 7 |
| 1-7 | 2-7 | 3-7 | 4-7 | 5-7 | 6-7 | 7 | — |

Table 2 shows the ineffective byte positions on the left of the left end of the operand. For example, when CNT1(0-2) are "5" and the operand length is five-byte length, the byte position 0 is the ineffective byte (for the first operand in the register 11 of FIG. 3).

TABLE 2

| Operand Byte Length | Content of CNT1(0-2) | | | | | | | |
|---|---|---|---|---|---|---|---|---|
| | 0 | 1 | 2 | 3 | 4 | 5 | 6 | 7 |
| 0 | 0 | 0-1 | 0-2 | 0-3 | 0-4 | 0-5 | 0-6 | 0-7 |
| 1 | — | 0 | 0-1 | 0-2 | 0-3 | 0-4 | 0-5 | 0-6 |
| 2 | — | — | 0 | 0-1 | 0-2 | 0-3 | 0-4 | 0-5 |
| 3 | — | — | — | — | 0-1 | 0-2 | 0-3 | 0-4 |
| 4 | — | — | — | — | 0 | 0-1 | 0-2 | 0-3 |
| 5 | — | — | — | — | — | 0 | 0-1 | 0-2 |
| 6 | — | — | — | — | — | — | 0 | 0-1 |
| 7 | — | — | — | — | — | — | — | 0 |
| 8 for longer | — | — | — | — | — | — | — | — |

The above indicates that the ineffective bytes of the second operand also can be determined from the three lower bits CNT1(0-2) at the right end address of the first operand and the second byte length of the operand.

Thus, by supplying the first and second operands which have been zero assured for the ineffective bytes shown in the Tables 1 and 2, to the arithmetic operation circuit, a correct operation result is obtained. Symbol "—" in Tables 1 and 2 indicates the absence of the ineffective byte.

Examples of the zero assurance circuits 16 and 17 shown in FIG. 3 are illustrated in FIG. 4, in which numeral 31 denotes a control circuit for the zero assurance circuit. It produces ineffective byte suppress signals 100-107 in response to inputs 150-152 and 170-173 in accordance with Tables 1 and 2. The inputs 150-152 indicate the right end byte position of the first operand, and the CNT1(0-2) are applied thereto. The inputs 170-173 indicate the operand length. The four bits in the $L_1$ field in FIG. 1 are applied thereto in the assurance circuit 16 of FIG. 3, and the four bits in the $L_2$ field in FIG. 1 are applied in the assurance circuit 17 of FIG. 3. While the zero assurance circuit 16 for the first operand in FIG. 3 is explained below, the zero assurance circuit 17 for the second operand in FIG. 3 is also similarly constructed.

Figure 5:
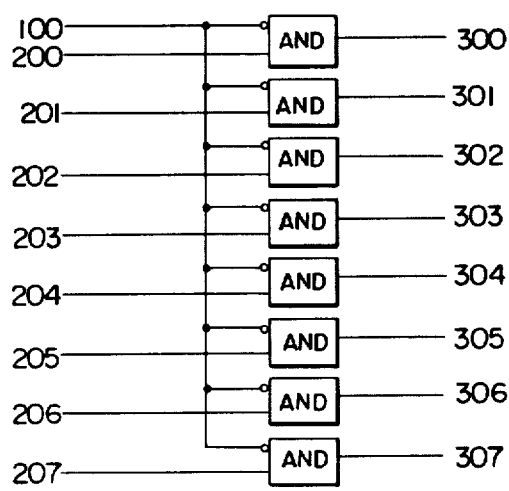
FIG. 5 is a logic circuit diagram of one stage of the gate circuit 32 of FIG. 4.

Numeral 32 in FIG. 4 denotes an eight-byte width gate circuit which gates signals 300-363 of first operand inputs 200-263 supplied from the register 11 to the adder 18. The signal 300-363 have their ineffective bytes zero-assumed by control signals 100-107 to the 0-th to seventh bytes. The outputs 300-363 of the gate 32 are applied to first operand input terminals of the adder shown in FIG. 3. Numeral 40 denotes the 0-th byte of the gate circuit 32, which is shown in detail in FIG. 5. In FIG. 5, the eight-bit input data signals 200-207 to the 0-th byte are gated by the control signal 100 and the output data signals 300-307 are produced. When the 0-th byte is an ineffective byte and zeros are to be assured, the control signal 100 assumes a logical "1" and the output data signals 300–307 all assume "0's." When the control signal 100 is logical "0," the input data signals 200–207 are directly gated as the output data signals 300–307.

FIGS. 6 through 9 show examples of the control circuit 31 of FIG. 4.

Figure 6:
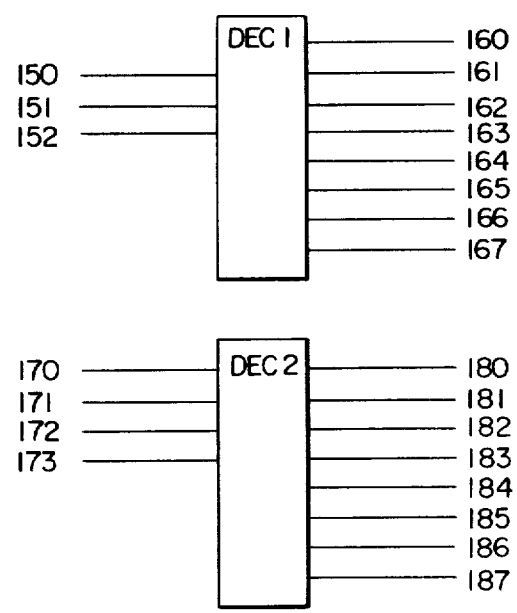
FIG. 6 is a logic circuit diagram of one portion of the control circuit 31 of FIG. 4
Figure 10A:
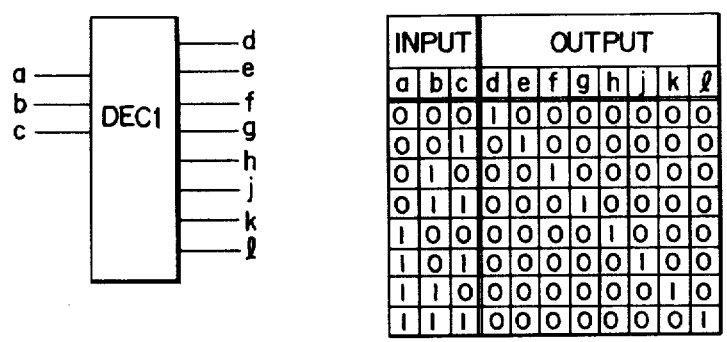
FIGS. 10A and 10B illustrate relations between input and output of the decoder shown in FIG. 6.
Figure 10B:
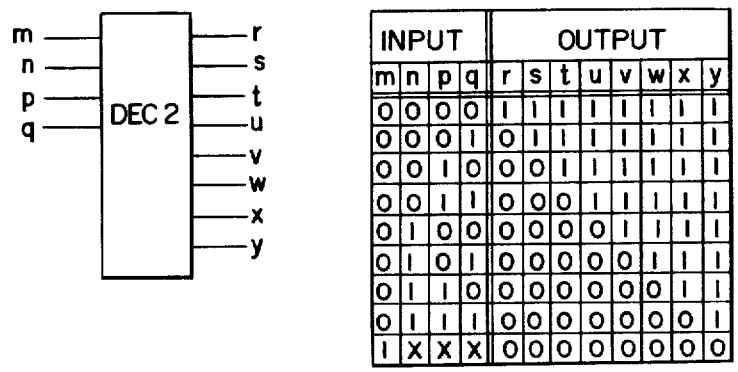

In FIG. 6, a decoder DEC1 of the signals 150–152 indicating the right end byte position of the first operand, that is, CNT1(0–2), and a decoder DEC2 for the signals 170–173 indicating the byte length of the first operand, that is, the L₁ field of the operand are shown. The relations between the inputs and the outputs of the decoders DEC1 and DEC2 are shown in FIGS. 10A and 10B.

Figure 7:
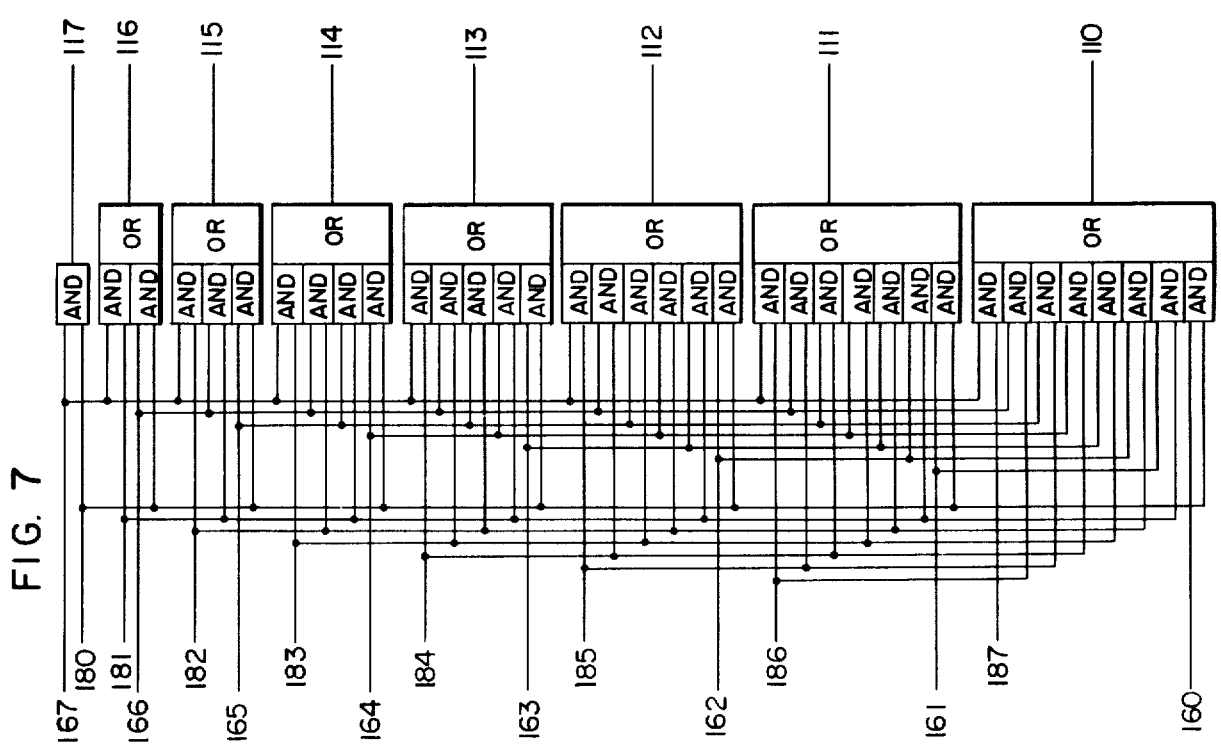
FIG. 7 is a logic circuit diagram of another portion of the control circuit 31 of FIG. 4.

FIG. 7 shows a logical circuit for determining the ineffective bytes on the left of the left end of the operand shown in Table 2. It responds to the decoder outputs 160–167 and 180–187 in FIG. 6 to produce the suppression signals 110–117 for the bytes 0–7.

Figure 8:
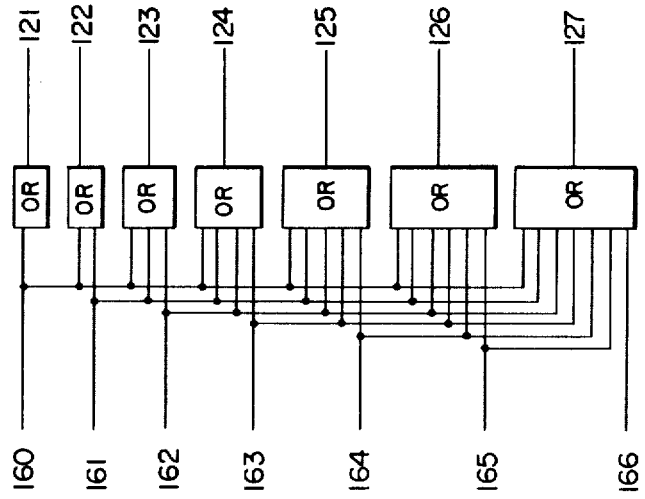
FIG. 8 is a logic circuit diagram of another portion of the control circuit 31 of FIG. 4.

FIG. 8 shows a logic circuit for determining the ineffective bytes on the right of the right end of the operand shown in Table 1, and it responds to the decoder outputs 160–166 in FIG. 6 to produce the suppression signals 121–127 for the bytes 1–7.

Figure 9:
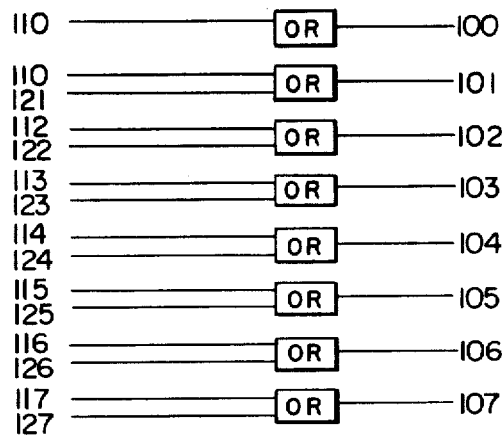
FIG. 9 is a logic circuit diagram of another portion of the control circuit 31 of FIG. 4.

FIG. 9 shows OR circuits for the ineffective byte suppression signals 110–117 and 121–127 shown in FIGS. 7 and 8. The outputs 100–107 from the OR circuits serve as the suppression signals for the outputs of the control circuit of FIG. 4 or the input data for the 0-th to seventh bytes to the adder.

While the zero assurance circuit 16 for the first operand in FIG. 3 has been described, the zero assurance circuit 17 for the second operand in FIG. 3 can be similarly constructed.

The operation of the arithmetic unit having the zero assurance circuit is explained for a case where the operand crosses an eight-byte boundary. It is assumed that the right end byte of the first operand is at the byte position 4 within the eight-byte boundary and the first operand is of nine-byte length. The first operand is carried out with CNT1(0:2)=4 as described above and the fifth to seventh bytes of the inputs to the arithmetic unit are set to zero in accordance with Tables 1 and 2 and the result of operaion appears at 0th to fourth byte positions. After the completion of the first operation, CNT1(0–2) are set to "7" and the number of bytes processed in the first operation is subtracted from the operand length L₁. In the present example, since five bytes have been processed in the first operation, the five bytes are subtracted from the nine bytes resulting in four remaining bytes. The final carry in the first operation is stored to use it as an initial carry in the second operation. In the second operation, since CNT1(0–2) are "7" as seen from Table 2 and the operand is of four-byte length, the bytes 0–3 of the inputs are rendered zero and the operation result appears at the byte positions 4–7. The operation results of the two operations are stored in the first operand address on the main memory.

The preferred embodiment of the present invention has thus been described. The present invention is also applicable to an operation instruction in which the left end position of the first operand in the main memory and the left end position of the second memory are aligned and the result of the operation is stored at the first operand position. The ineffective bytes on the right of the right end of the operand and the ineffective bytes on the left of the left end of the operand are shown in Tables 3 and 4. The circuits for assuring zeros for the ineffective bytes may be realized by substantially identical logic circuits to those shown in the above embodiments.

TABLE 3

| Operand Byte Length | Content of CNT1(0–2) | | | | | | | |
|---|---|---|---|---|---|---|---|---|
| | 0 | 1 | 2 | 3 | 4 | 5 | 6 | 7 |
| 0 | 0–7 | 1–7 | 2–7 | 3–7 | 4–7 | 5–7 | 6–7 | 7 |
| 1 | 1–7 | 2–7 | 3–7 | 4–7 | 5–7 | 6–7 | 7 | — |
| 2 | 2–7 | 3–7 | 4–7 | 5–7 | 6–7 | 7 | — | — |
| 3 | 3–7 | 4–7 | 5–7 | 6–7 | 7 | — | — | — |
| 4 | 4–7 | 5–7 | 6–7 | 7 | — | — | — | — |
| 5 | 5–7 | 6–7 | 7 | — | — | — | — | — |
| 6 | 6–7 | 7 | — | — | — | — | — | — |
| 7 | 7 | — | — | — | — | — | — | — |
| 8 or longer | — | — | — | — | — | — | — | — |

TABLE 4

| Content of CNT1(0–2) | | | | | | | |
|---|---|---|---|---|---|---|---|
| 0 | 1 | 2 | 3 | 4 | 5 | 6 | 7 |
| — | 0 | 0–1 | 0–2 | 0–3 | 0–4 | 0–5 | 0–6 |

As is apparent from the description set forth above, the present invention can reduce the time required for the alignment of the operand position when the variable operand length instruction is processed a plurality of bytes at a time, and zeros are assured at a high speed for the ineffective bytes of the operand. Accordingly, the execution time of the instruction can be substantially reduced.

What is claimed is:

1. A data processing system for processing first and second operands each starting from a designated address in a memory and having a designated number of bytes comprising:

designation means for designating leading addresses and the byte lengths representing the number of bytes of said first and second operands in said memory;

first and second hold means connected to said memory for holding said first and second operands read from said memory, respectively;

alignment means connected to said designation means and said second hold means for shifting the second operand supplied from said second hold means by an amount indicated by the leading addresses of the first and second operands designated by said designation means so as to align the operand position of said second operand with the operand position of said first operand;

first control means connected to said designation means for indicating ineffective byte positions in the first operand for arithmetic operation based on the leading address and the byte length of the first operand indicated in said designation means, said first control means including:

(a) first indicating means for indicating the byte position on the left of the left end of said first operand, (b) second indicating means for indicating the byte position on the right of the right end of said first operand and, (c) means connected to said first and second indicating means for indicating ineffective byte positions of said first operand for arithmetic operation in response to the indications of said first and second indicating means;

second control means connected to said designation means for indicating ineffective byte positions in the second operand for arithmetic operation based on the leading address of the first operand and the byte length of the second operand indicated by said designation means, said second control means including:
- (a) third indicating means for indicating the byte position on the left of the left end of said second operand,
- (b) fourth indicating means for indicating the byte position on the right of the right end of said second operand and,
- (c) means connected with said third and fourth indicating means for indicating ineffective byte positions in said second operand for arithmetic operation in response to the indications of said third and fourth indicating means;

first gate means connected to said first hold means and said first control means for suppressing the ineffective byte positions of the first operand supplied from said first hold means in response to the indication from said first control means to thereby output the first operand;

second gate means connected to said alignment means and said second control means for suppressing the ineffective byte positions of the second operand supplied from said alignment means in response to the indication from said second control means to thereby output the second operand; and arithmetic operation means connected to said first and second gate means for carrying out an arithmetic operation on the first and second operands supplied from said first and second gate means to produce an output of the result.

2. The data processing system according to claim 1, wherein said first indicating means is connected to receive signals representing the leading address and the length of said first operand, said second and fourth indicating means are connected to receive a signal representing the leading address of the first operand, and said third indicating means is connected to receive signals representing the leading address of the first operand and the length of the second operand.

3. The data processing system according to claim 2, wherein said first and second gate means include means for placing zero at suppressed byte positions.

* * * * *